(12) United States Patent
Zanon et al.

(10) Patent No.: US 12,261,678 B1
(45) Date of Patent: *Mar. 25, 2025

(54) AOCS SYSTEM TO MAINTAIN PLANARITY FOR SPACE DIGITAL BEAM FORMING USING CARRIER PHASE DIFFERENTIAL GPS, IMU AND MAGNET TORQUES ON LARGE SPACE STRUCTURES

(71) Applicant: AST & Science, LLC, Midland, TX (US)

(72) Inventors: Darren J. Zanon, Falls Church, VA (US); Raymond J. Sedwick, University Park, MD (US)

(73) Assignee: AST & Science, LLC, Midland, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/362,165

(22) Filed: Jul. 31, 2023

Related U.S. Application Data

(63) Continuation of application No. 17/175,262, filed on Feb. 12, 2021, now Pat. No. 11,722,211.

(60) Provisional application No. 62/976,143, filed on Feb. 13, 2020.

(51) Int. Cl.
| | |
|---|---|
| *H04B 7/185* | (2006.01) |
| *H01Q 1/28* | (2006.01) |
| *H01Q 3/30* | (2006.01) |
| *H04B 7/024* | (2017.01) |
| *H04W 84/06* | (2009.01) |

(52) U.S. Cl.
CPC ........ *H04B 7/18513* (2013.01); *H01Q 1/288* (2013.01); *H01Q 3/30* (2013.01); *H04B 7/024* (2013.01); *H04B 7/18534* (2013.01); *H04W 84/06* (2013.01)

(58) Field of Classification Search
CPC .......................... H04B 7/18513; H04B 7/024; H04B 7/18534; H01Q 1/288; H01Q 3/30; H04W 84/06
See application file for complete search history.

(56) References Cited

U.S. PATENT DOCUMENTS

| | | |
|---|---|---|
| 3,803,626 A | 4/1974 | Garrett |
| 5,151,710 A | 9/1992 | De Place |
| 5,163,176 A | 11/1992 | Flumerfelt et al. |
| 5,185,608 A | 2/1993 | Pozgay |
| 5,187,486 A | 2/1993 | Kolzer |
| 5,430,451 A | 7/1995 | Kawanishi et al. |
| 5,440,320 A | 8/1995 | Lach |
| 5,623,270 A | 4/1997 | Kempkes et al. |
| 5,666,128 A | 9/1997 | Murray et al. |
| 5,673,057 A * | 9/1997 | Toland ................. H01Q 19/191 343/781 CA |

(Continued)

OTHER PUBLICATIONS

Prosecution History from U.S. Appl. No. 17/175,262, now issued U.S. Pat. No. 11,722,211, dated Feb. 12, 2021, through Jun. 29, 2023, 97 pp.

*Primary Examiner* — Fred A Casca
(74) *Attorney, Agent, or Firm* — Shumaker & Sieffert, P.A.

(57) ABSTRACT

A closed-loop motion monitoring and control system for structural mode control in a large, flexible space structure. The system uses combined sensor data to detect low-magnitude, low-frequency motion, estimate structure deformation constants, and damp structural vibrations with electromagnetic torque application.

17 Claims, 10 Drawing Sheets

(56) References Cited

U.S. PATENT DOCUMENTS

| | | |
|---|---|---|
| 5,894,291 A | 4/1999 | Lee |
| 6,082,719 A | 7/2000 | Shtarkman et al. |
| 6,084,545 A | 7/2000 | Lier et al. |
| 6,320,538 B1 | 11/2001 | Lalezari et al. |
| 6,333,712 B1 | 12/2001 | Haugse et al. |
| 6,680,697 B2 | 1/2004 | Bruzzone et al. |
| 6,720,918 B2 | 4/2004 | Reckdahl et al. |
| 6,879,875 B1 | 4/2005 | Hu et al. |
| 6,954,173 B2 | 10/2005 | Mrstik |
| 7,460,067 B2 | 12/2008 | Allen et al. |
| 7,522,097 B2 | 4/2009 | Wakeman |
| 8,077,083 B2 | 12/2011 | Blake |
| 8,184,042 B2 | 5/2012 | Ray et al. |
| 8,260,336 B2 | 9/2012 | Johansson et al. |
| 8,930,047 B2 | 1/2015 | Robinson et al. |
| 8,957,807 B2 | 2/2015 | Mills et al. |
| 8,972,310 B2 | 3/2015 | Kearns et al. |
| 9,019,153 B1 | 4/2015 | Schuss et al. |
| 9,973,266 B1* | 5/2018 | Avellan .............. H04B 7/18519 |
| 10,587,054 B2 | 3/2020 | Rosenkrantz et al. |
| 10,884,094 B2 | 1/2021 | Johnson et al. |
| 11,722,211 B1 | 8/2023 | Zanon et al. |
| 2007/0194982 A1 | 8/2007 | Stove |
| 2015/0330851 A1* | 11/2015 | Beligere .................. H02J 50/12 29/601 |
| 2017/0227361 A1 | 8/2017 | El-Sheimy et al. |
| 2017/0229782 A1 | 8/2017 | Adriazola et al. |
| 2018/0011039 A1* | 1/2018 | Colosimo .............. G01N 33/42 |
| 2018/0069629 A1* | 3/2018 | Turgeon ................ H04B 10/90 |
| 2018/0359023 A1 | 12/2018 | Howard |
| 2019/0094386 A1 | 3/2019 | Matsue et al. |
| 2019/0131703 A1* | 5/2019 | Meyer .................... H01Q 1/246 |
| 2019/0238216 A1 | 8/2019 | Avellan et al. |
| 2020/0361635 A1 | 11/2020 | Braun et al. |
| 2020/0365966 A1 | 11/2020 | Honour et al. |
| 2020/0366237 A1 | 11/2020 | Hernandez Bahlsen et al. |

\* cited by examiner

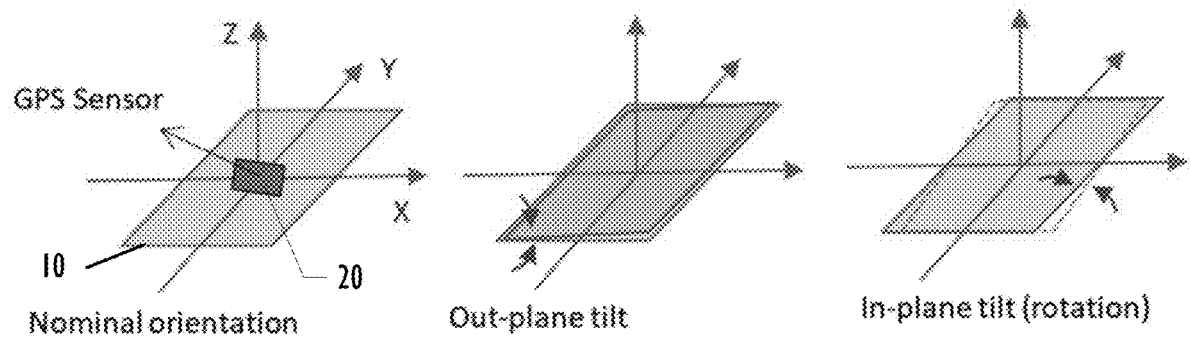
FIG. 7(a)  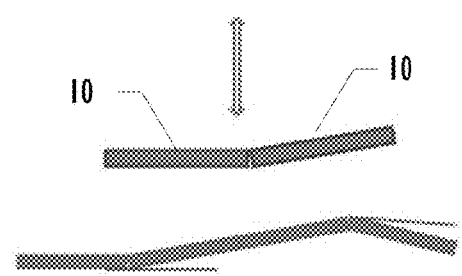 FIG. 7(b)  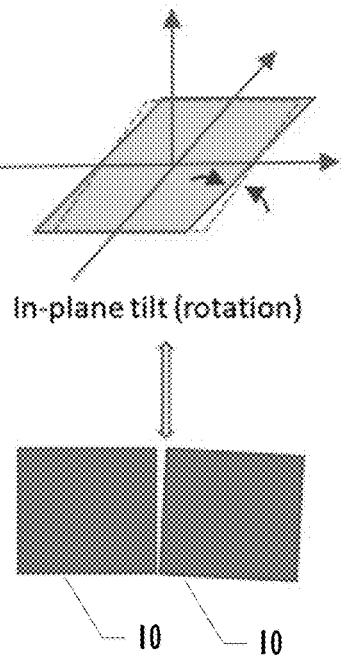 FIG. 7(c)
FIG. 8(a)  Out-plane displacements
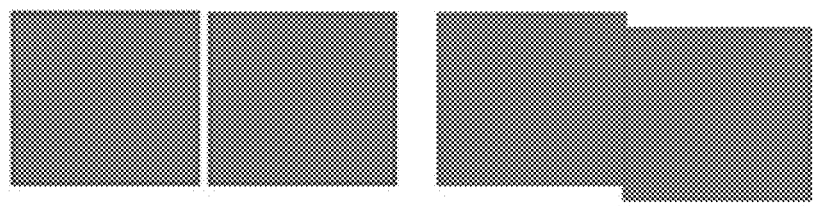
FIG. 8(b)  In-plane displacements

US 12,261,678 B1

AOCS SYSTEM TO MAINTAIN PLANARITY FOR SPACE DIGITAL BEAM FORMING USING CARRIER PHASE DIFFERENTIAL GPS, IMU AND MAGNET TORQUES ON LARGE SPACE STRUCTURES

RELATED APPLICATIONS

This application is a continuation of U.S. application Ser. No. 17/175,262, filed 12 Feb. 2021, which claims the benefit of U.S. Provisional Patent Application No. 62/976,143, filed 13 Feb. 2020, the entire content of each application is incorporated herein by reference.

FIELD

This disclosure relates to the fields of motion determination and motion control for large, flexible space structures. Flexible structures are those whose stiffness is low along one or more axes such that the structure exhibits broad, slow differential displacements along that axis when exposed to external forces and torques. The disclosure resolves challenges of measuring and controlling this motion. The disclosure includes a sensor suite for measuring displacements, a means of integrating these measurements and estimating displacements in real time, and control implementation.

BACKGROUND

U.S. Pat. No. 9,973,266 and U.S. Publ. No. 2019/0238216 show a system for assembling a large number of small satellite antenna assemblies in space to form a large array. The entire content of the '266 patent is incorporated herein by reference. As disclosed in the '266 Patent, FIGS. 1(a), 1(b) show a satellite communication system 100 having an array 300 of common or small satellites 302 and a central or control satellite 200. The small satellites 302 communicate with end users 500 within a footprint 400 on Earth, and also communicate with the control satellite 200, which in turn communicates with a gateway 600 at a base station. The small satellites 302 can each include, for example, a processing device (e.g., a processor or controller) and one or more antenna elements. And the control satellite 200 can include a processing device and one or more antenna or antenna elements.

SUMMARY

A large array in space is formed by joining several smaller elements by connectors, such as joints, hinges, tape-springs. Each element can be considered as rigid, flexure being largely in the connectors that connect the elements to each other. The connectors have a storage configuration in which they are bent so that the antenna elements 300 are folded upon each other to be compact for transport into space. And the connectors have default bias to a deployed configuration in which they expand so that the antenna elements are unfolded and expand into a large planar configuration in space. In addition, the control satellite 200 need not be distinct from the small satellites 302, but rather the control satellite 200 can be connected to the small satellites 302, such as directly embedded within the array 100.

However, low mass-per-unit aperture arrays can physically bend or deviate from their nominal positions due to external forces in deployed orbit around the Earth (e.g., low earth orbit (LEO), medium earth orbit (MEO), etc.). For example, there can be both displacement and rotation in the connectors. Analysis has revealed that there could be as much as 70 cm displacement in an 8 m diameter array, which can be corrected to displacement of 10 cm or less by appropriate mechanical or structural compensations. This can be achieved by use of, e.g., torque rods that apply a magnetic moment against the Earth's magnetic field which moves the connectors toward their fully deployed configuration and moves the array of antenna elements toward the full planar configuration. Residual displacement (after the mechanical compensation) is compensated by beamforming corrections. Thus, the structural compensation described herein applies a coarse correction, whereas the phase adjustment applies a fine correction.

Accordingly, a system and method are provided to monitor and correct for motions caused by various mechanical modes of deviation to reduce structural deflections that may affect beamforming.

BRIEF DESCRIPTION OF THE FIGURES

FIGS. 7(a)-7(c) show in-plane and out-plane tilts that may be present in each small satellite.
FIGS. 8(a), 8(b) show relative in-plane and out-plane displacements that may be present across small satellites.

DETAILED DESCRIPTION

Figure 1A:
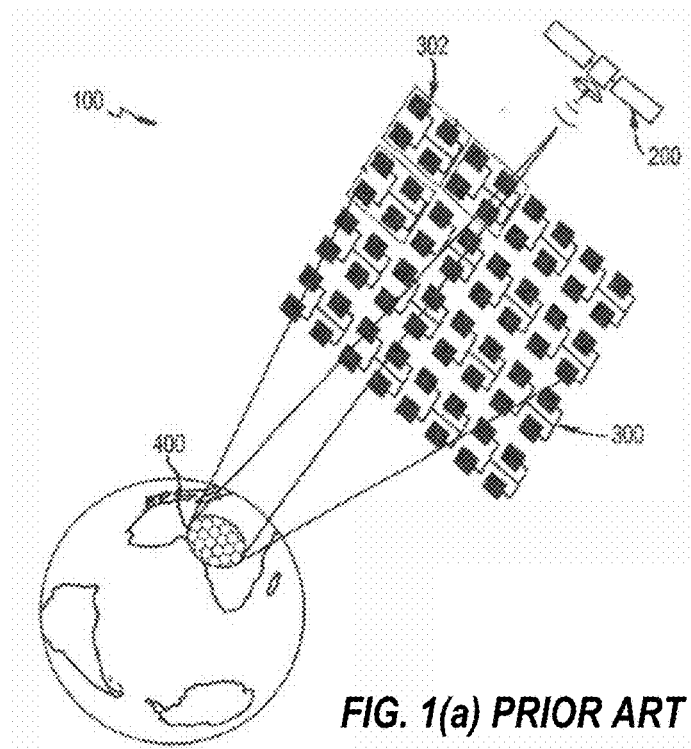
FIGS. 1(a), 1(b) show a known phased array.

In describing the illustrative, non-limiting embodiments of the disclosure illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments of the disclosure are described for illustrative purposes, it being understood that the disclosure may be embodied in other forms not specifically shown in the drawings.

Figure 2:
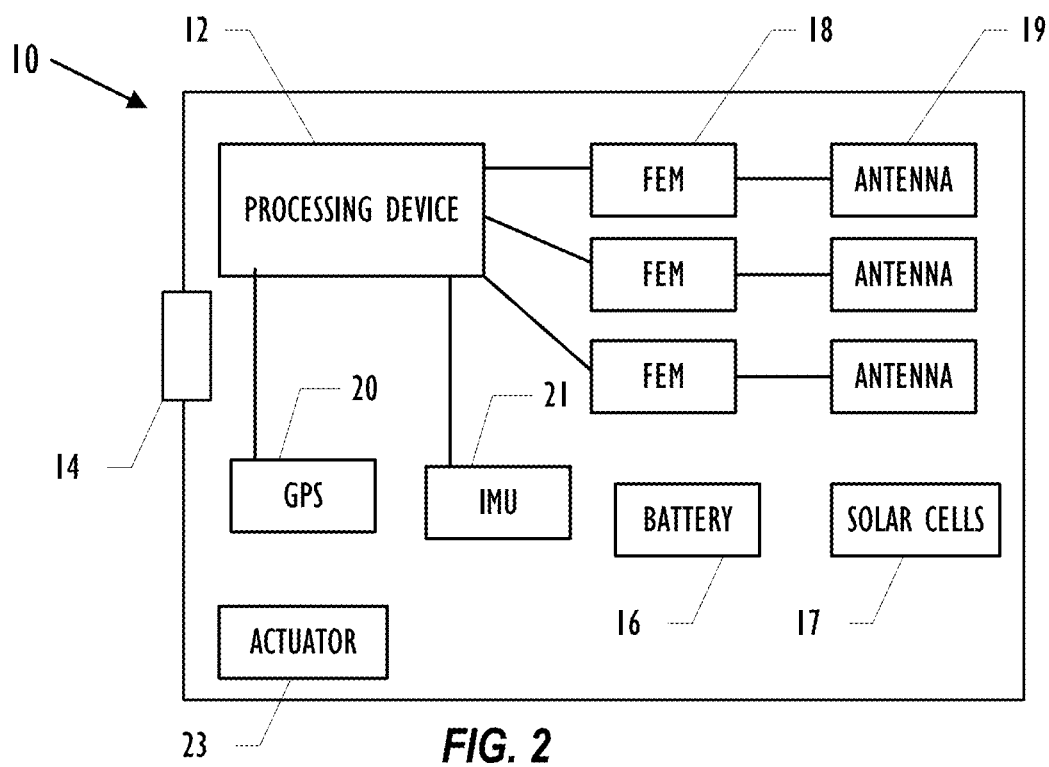
FIG. 2 is a block diagram of a structure.

Referring to FIG. 2, in one example embodiment, only the electronics of a single small satellite 302 is shown. In this embodiment the structure 10 is an assembly or common small satellite that is connected to other antenna assemblies in a large antenna array 5 (FIG. 3), such as in the antenna assembly 300 and array 100 of the '266 Patent (FIG. 1(a)). The overall system forms an Altitude and Orbit Control System (AOCS) that can include the common satellite 10, control satellite 200, and/or ground station. The control satellite 200 can be fixedly connected to the small satellites 302, such as at the center of the array as in 5 (FIG. 3(a)).

Figure 3A:
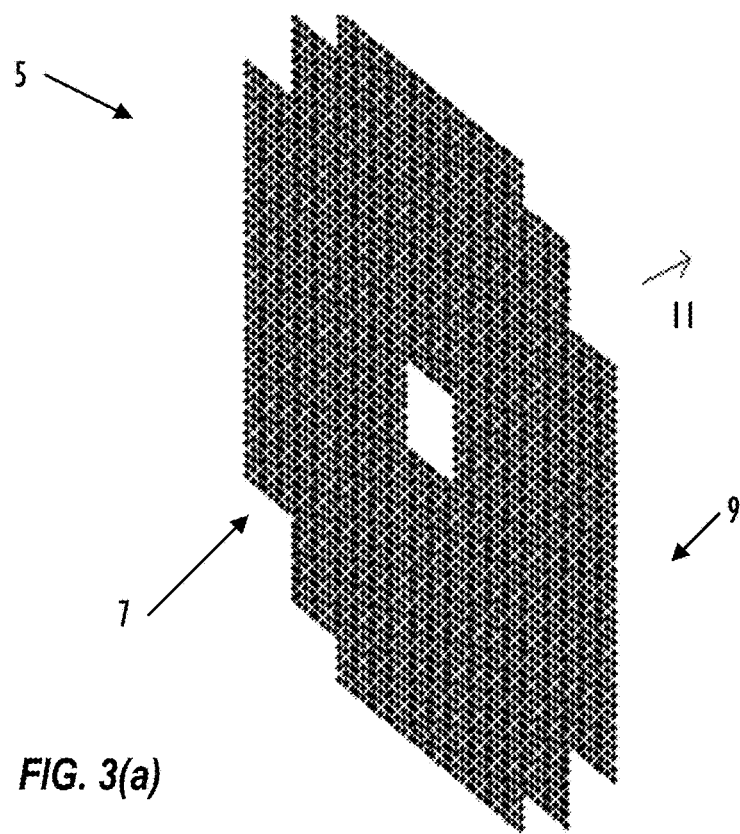
FIG. 3(a) is a perspective view of a large phased array formed by integrating several small satellites in space.

The structure 10 is flat and rectangular or square, with the communication components (e.g., antenna elements 19) at one side surface 7 (FIG. 3(a)) facing the Earth (nadir) to communicate with user devices (e.g., cell phones) and an opposite side surface 9 (FIG. 3(a)) facing in the opposition direction (zenith) with solar cells 17 that generate solar power for use by the electronic components, e.g., a processing device 12, antennas 19, battery 16, and antenna front end modules 18.

Each structure 10 also has one or more connectors 14, such as a hinge, joint, spring or tape-spring connector, that connect the structure 10 to one or more neighboring similar structures 10. As shown, the structure 10 can be rectangular or square and encompass multiple antenna elements 300, and one or more connectors can be positioned at or along one or more of the edges or sides of the structure 10. It will be recognized that the system can utilize any suitable connection system, for example such as the one shown and described in U.S. Patent Pub. Nos. 2020/0361635, 2020/0366237, and 2020/0365966, the entire contents of which are hereby incorporated by reference.

The connectors can be subject to bending or flexing in the operating configuration. For example, the maximum flex at the connector 14 might be several degrees. Any flex results in a deviation of the antenna elements from the planar configuration in which the communication side (and/or the solar side) of the plurality of antenna elements are planar. That deviation is undesirable since it can affect beam formation.

In this example embodiment, it is therefore desirable for the array 5 to be substantially flat on both the solar side and the communication side, i.e., that the individual structures 10 are flat on both sides and that they are planar or co-planar with one another on both sides so that the overall array 5 is planar on both sides. However, the structure 10 and/or array 5 is subject to forces in space that can cause the structure 10 or array 5 to flex or bend.

FIGS. 3(a), (b) show a nearly circular large planar phased array 5 formed in space by integrating many small satellite structures 10. Each small satellite could host a processing device 12 (e.g., processor) and several antenna elements 19. Hundreds of such small satellites together could form a large phased array with thousands of overall antenna elements. In one embodiment, each small satellite (referred to here as a micron) has an antenna assembly with antenna elements 19 arranged in four rows and four columns in a square shape. The overall phased array formed by the interconnection of several small satellites could take a square, or a rectangular or a circularized shape as desired by the application. Any suitable small satellite can be utilized, such as shown and describe in U.S. Pub. Nos. 2020-0361635, 2020-0366237, and 2020-0365966, the entire contents of which are hereby incorporated by reference.

The antenna elements 19 are positioned at the communication side surface 7 of the array and the solar cells are positioned at the solar side 9 of the array 5. The arrow 11 shows the boresight, which for a planar phased array refers to a normal to the array's plane. Any beam off-boresight is called an edge beam (e.g., FIG. 6)

The small satellites 10 communicate with end user devices (such as cell phones) on Earth, and with the central processor 200, which in turn communicates with a gateway at the ground station. The signals communicated to/by the small satellites are aggregated together, such that the small satellites collectively transmit and receive signals to the end user devices. However, any bending or flexing of the array can cause the signals from the individual small satellites to deviate or be out of phase from the desired phase.

FIGS. 4(a), 4(b), 5(a), 5(b) show the gradual bending effect in large arrays from the center towards the edge of the arrays. The individual antenna assemblies are rigid, but are mechanically coupled to one another by the connectors 14. Those connectors hold the small satellites together, but are subject to bending or flexing, and tend to oscillate inwards and outwards at low frequency, with maximum displacements at the extremities, depending on the external forces. As the mass per unit aperture is reduced, the stiffness of the array is reduced and the array encounters greater flexure. The arrows in FIGS. 4(a), 5(a) point to the boresight of the array.

Figure 4A:
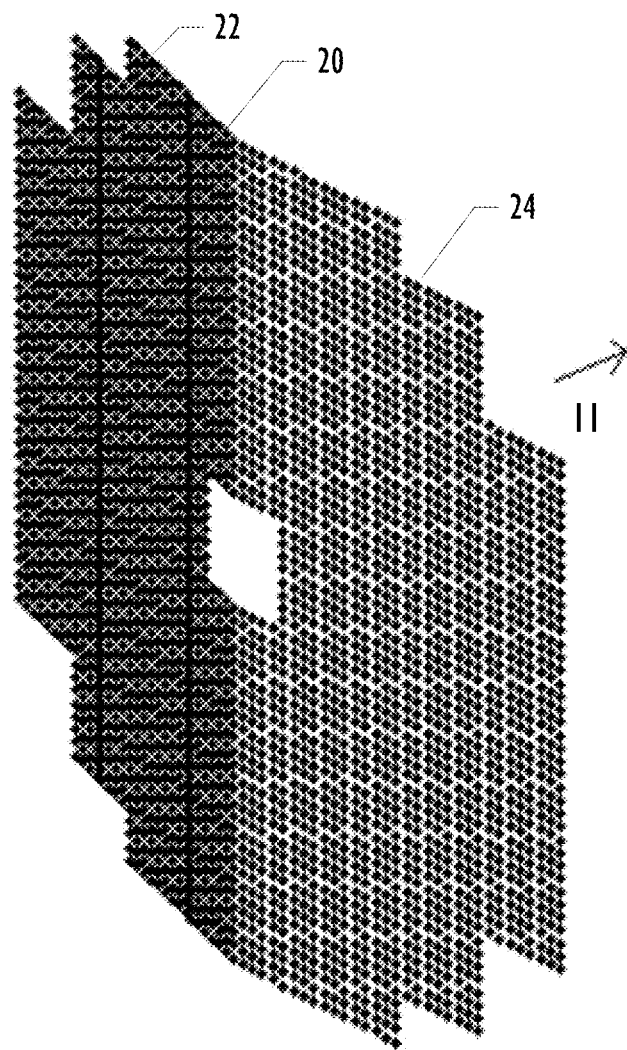
FIG. 4(a) is a perspective view showing bending of a satellite antenna array due to external forces.
Figure 4B:
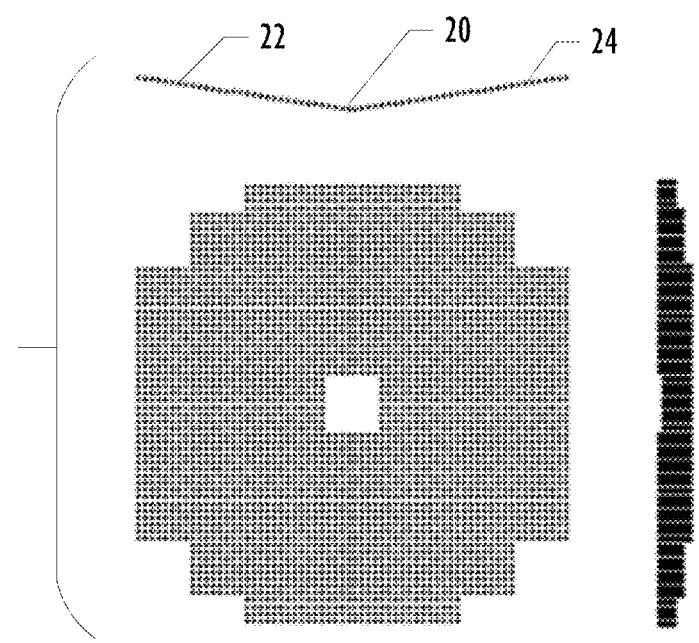
FIG. 4(b) shows a front view, top view and right-side view of the array of FIG. 2(a).
Figure 5A:
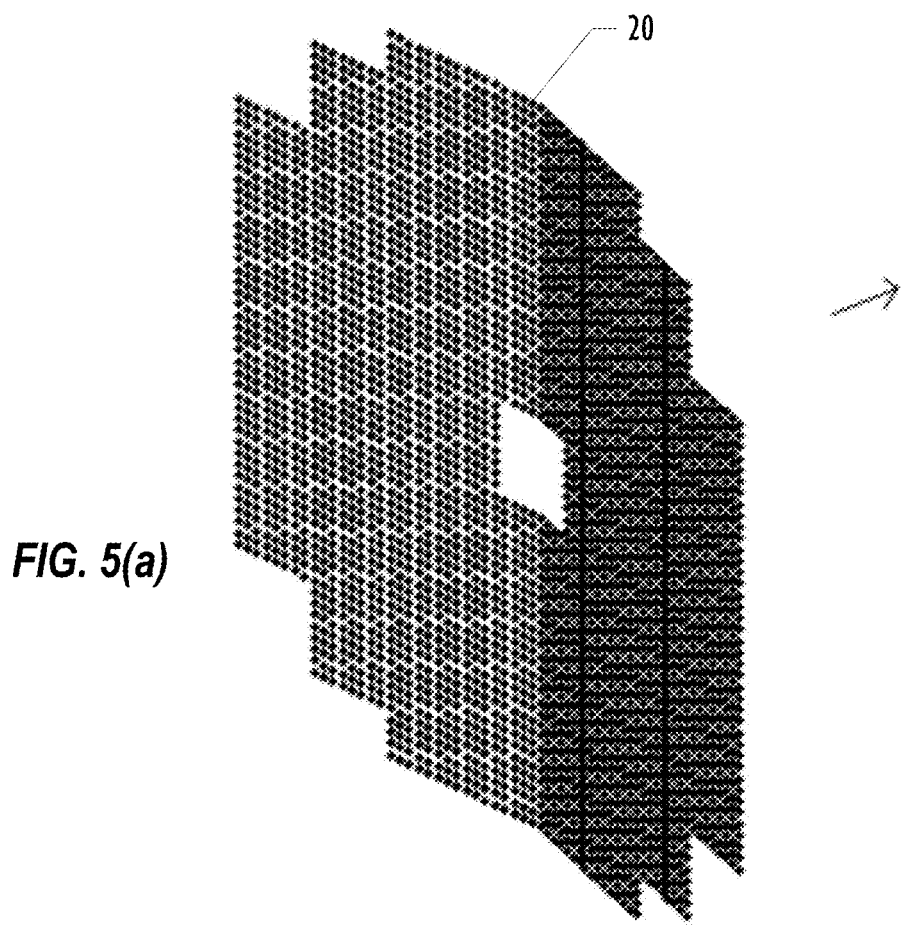
FIG. 5(a) is a perspective view showing bending of a satellite antenna array due to external forces.
Figure 5B:
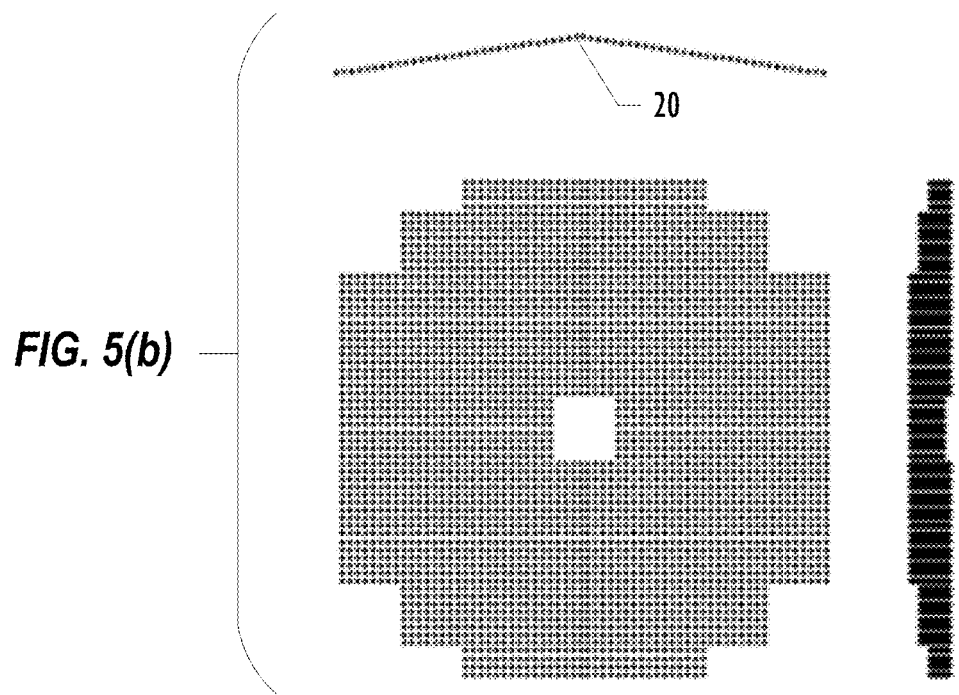
FIG. 5(b) shows a front view, top view and right-side view of the array of FIG. 3(a).

FIGS. 4(a), 4(b) illustrate the inward (towards the arrow 11 or boresight) flexing of the array, and FIGS. 5(a), 5(b) illustrate the outward (away from the arrow 11 or boresight) flexing of the array. The array is imagined to be in a nominal plane that is normal or perpendicular to the boresight. The flexing causes deviation from the nominal plane.

The example of FIGS. 4, 5, shows a single bend 20 in the array 5. However, other bends are possible, for example bends that only partially extend along the array, bends that are offset from the center diameter, bends that extend at other positions and locations that do not pass through the center of the array, and multiple bends. And, while the bend 20 is shown having a sharp angle between the left and right halves 22, 24, the bend can be more curved. And, the left and right halves 22, 24 need not be planar, but can be curved due to slight deviations or bends at connectors between antenna modules 10.

Figure 3B:
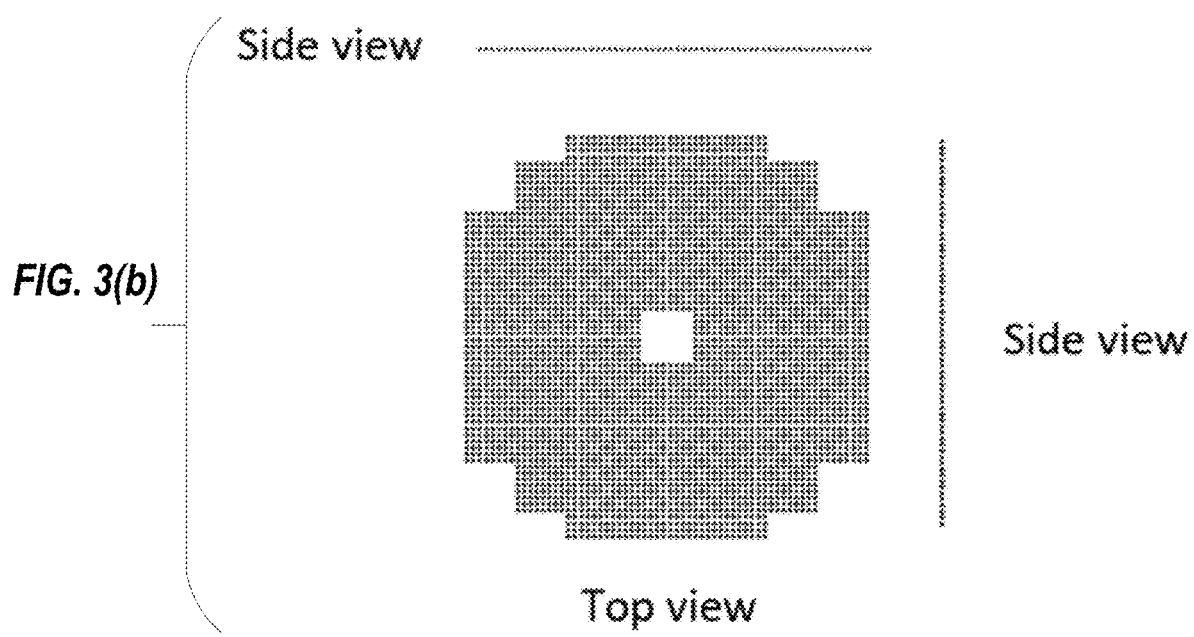
FIG. 3(b) shows a front view, top view, and right-side view of the array of FIG. 3(a).
Figure 6:
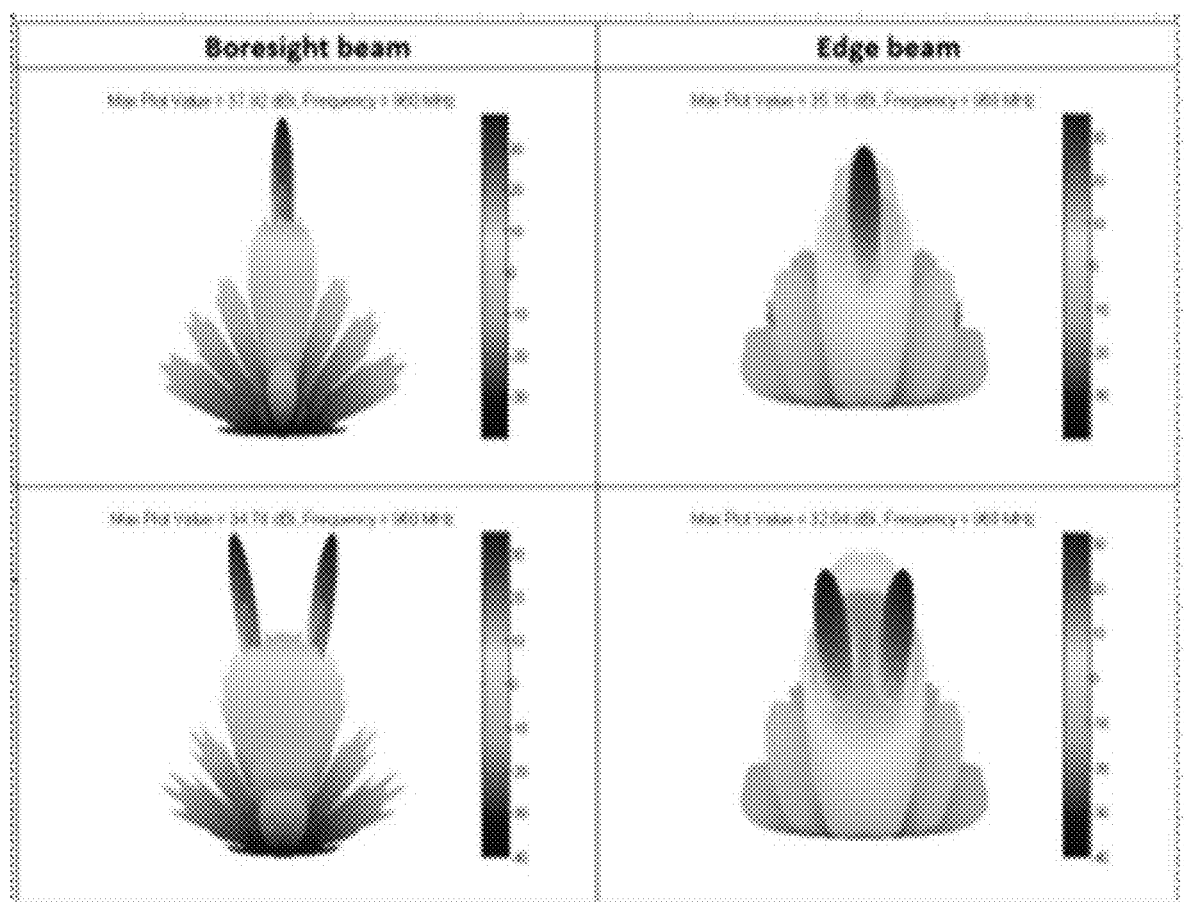
FIG. 6 shows radiation patterns.

Referring to FIG. 6, the top row of measurements shows the expected radiation patterns from a 10.3 m planar array of FIG. 3 while forming the beams towards the boresight of the array and edge of the footprint. The bottom row of measurements in FIG. 6 shows the expected radiation patterns for an array of FIGS. 4, 5 with 8.7☐ bending from nominal plane without any compensation for change in antenna elements' position while beamforming. As shown, there is a distorted radiation pattern with dual main-lobe and the reduced array gain due to bending of the array.

While FIGS. 4, 5 show uniform bending effect, there could be random perturbations in the position of each small satellite structure 10 while deploying and attaching to neighboring small satellites. FIG. 7(a) shows a nominal orientation for a structure 10, and FIGS. 7(b)-7(c), 8(a)-8(b) show such perturbations in the form of in-plane and out-plane tilts and displacements for a plurality of antenna elements. FIG. 7(a) and the top drawings of FIGS. 7(b), 7(c), each show a single structure 10 (which may have multiple antenna elements). FIGS. 8(a), 8(b), and the bottom drawings in FIGS. 7(b), 7(c) show multiple structures 10 coupled to one another by connectors, and bending at each connector. General displacements such as those in FIG. 8 are not controllable as described in the current embodiment, but such displacements are observable using the determination methods described herein if they are sufficiently large. Thus, FIGS. 4, 5, 7, 8 depict the main types of perturbations that are likely to occur, any of which may increase the distortion of the radiation pattern. The embodiment described herein has significant utility for near-planar arrays but may be utilized in systems with larger non-planarity if a majority of such non-planarity is the result of modal perturbations.

Figure 9:
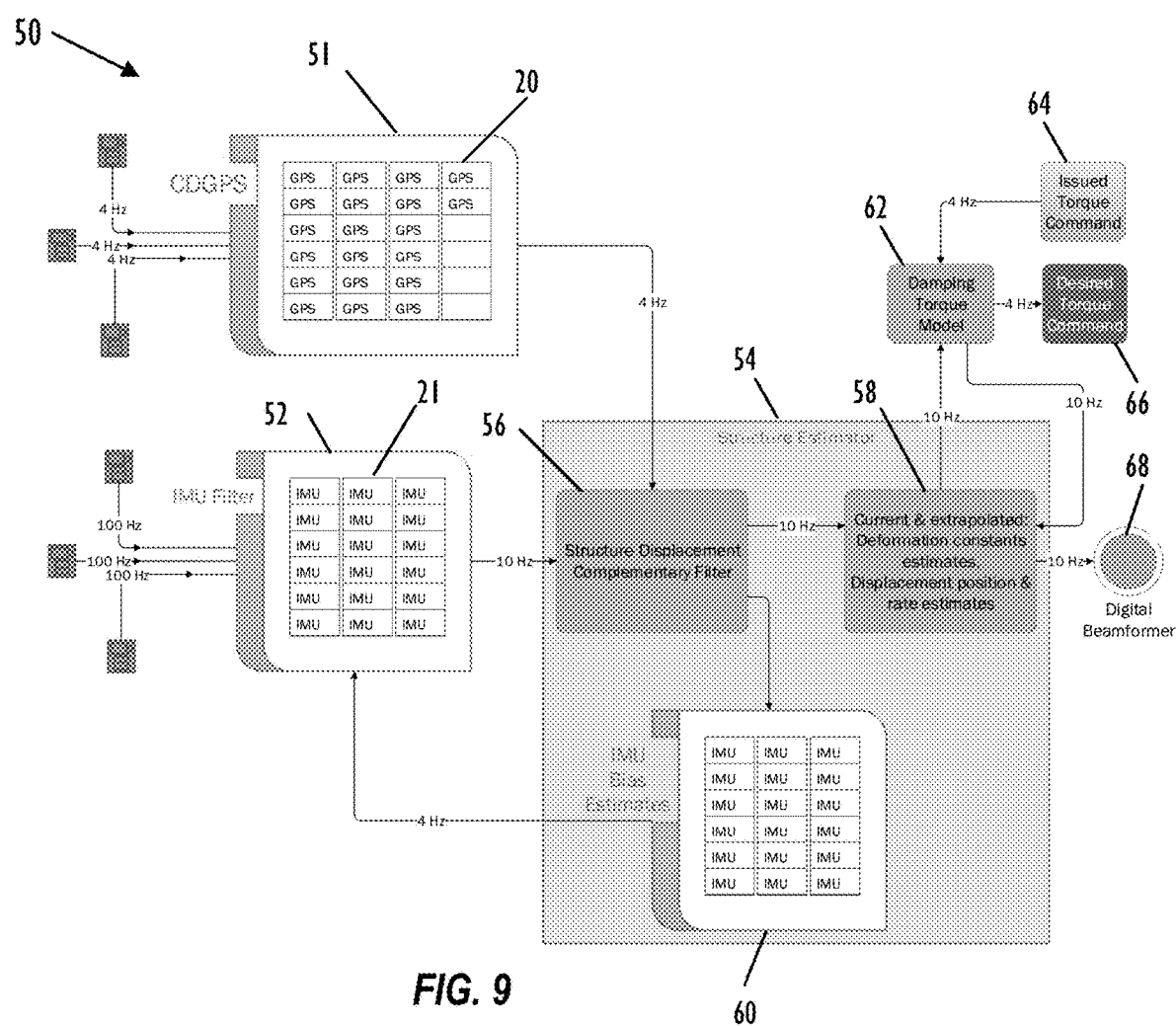
FIG. 9 is a block diagram overview of one embodiment of the present disclosure.
Figure 10:
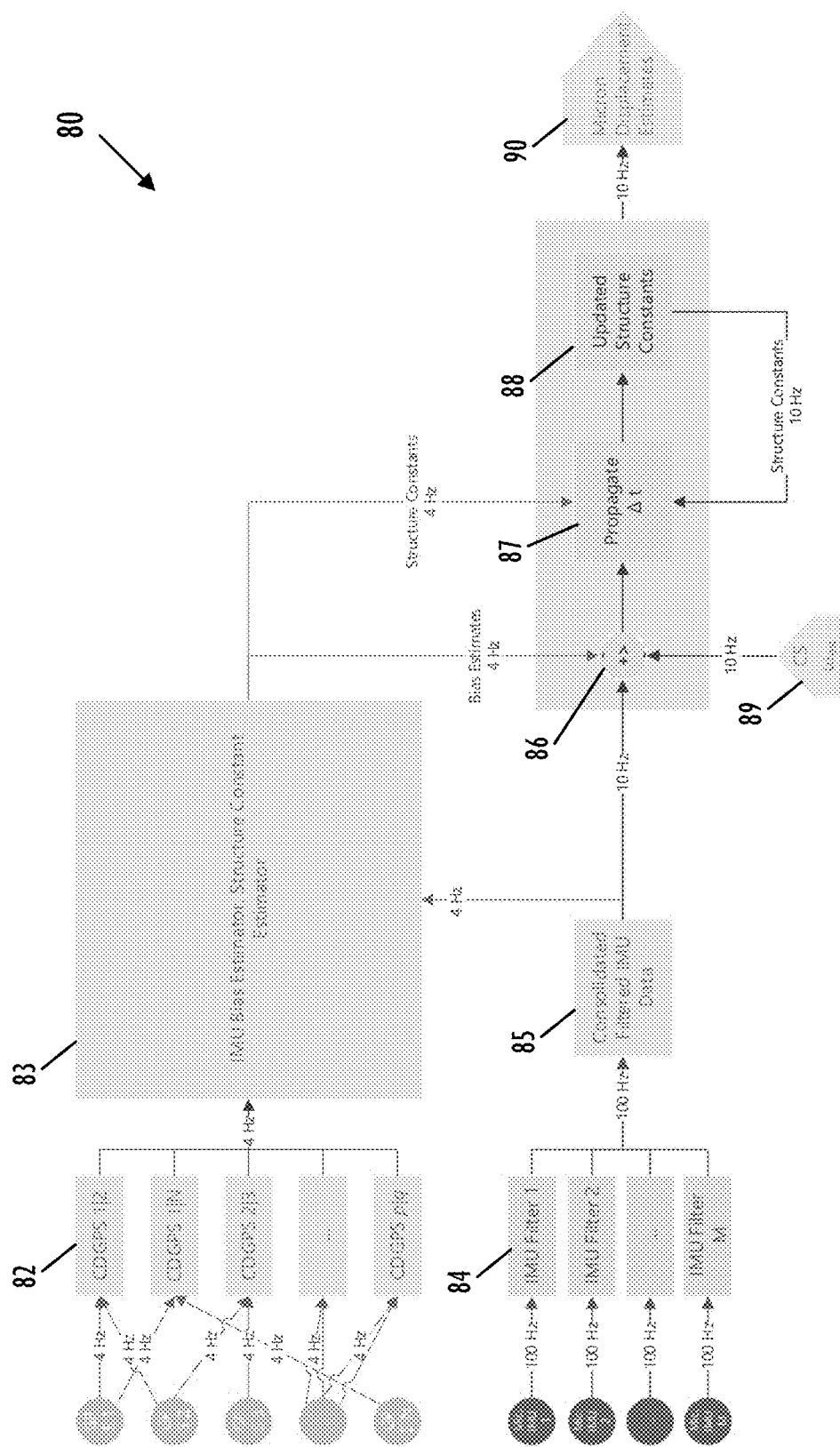
FIG. 10 is a block diagram of the estimator of FIG. 2.

FIG. 9 is one embodiment of the disclosure in which the structure 10 in FIG. 7 has a single Global Positioning System (GPS) unit that reports carrier phase data. A collection of such antenna elements collectively contain a set of GPS units 50 whose data is used to calculated a Carrier Phase Differential GPS (CD-GPS) array 51 of differential GPS solution 212. Each structure 10 also includes an Inertial Measurement Unit 49, and the collective IMU data is compiled in an array 52 of filtered IMU measurements 515. Such IMUs may be inertial sensing units which integrate acceleration only and/or directly detect angular motion, or other such inertial measurement devices.

The embodiment in FIG. 9 also includes a structure estimator 54 a computed torque model 62 based on that structure estimator, a torque command 66 issued to a torque mechanism, and a feedback element 64 from that torque mechanism. In one embodiment, the GPS sensors 50 are positioned as close as possible to the IMU sensors 49. The GPS sensors 50 and/or IMU sensors 49 are coupled to the structure elements 10; each structure 10 can have one or more GPS sensor 50 and one or more IMU sensor 49, or one GPS sensor 50 and/or one IMU sensor 49 can be associated with multiple structures 10. In one embodiment, the IMU sensors 49 are accelerometers that detect an acceleration.

The effect of modal array deformation caused by coupled flexure on beamforming can be minimized by considering the instantaneous position of each antenna element while computing the corresponding phases used for beamforming. This is accomplished by placing position sensors 50 (FIGS. 2, 7(*a*)) and IMUs 49 in several of the small satellites 10 for accurate position and rate estimation of each antenna element or minimum required sensors, to predict the uniform perturbation characteristic of the small satellites across array, to determine approximate position of each small satellite. For example, each small satellite 10 can have one or more sensors that are placed on the body of the structure, such as on the communication side (the side with the antennas 19) or the solar side (the side with the solar cells 17). The sensor placement is determined by the type of sensor to ensure observability of the sensed effect. In the current embodiment, the GPS antenna attached to the receiver 50 must face the GPS constellation and therefore must be on the solar side of the antenna element structure 10, while the IMU may be placed near the center of the structure 10.

Figure 11:
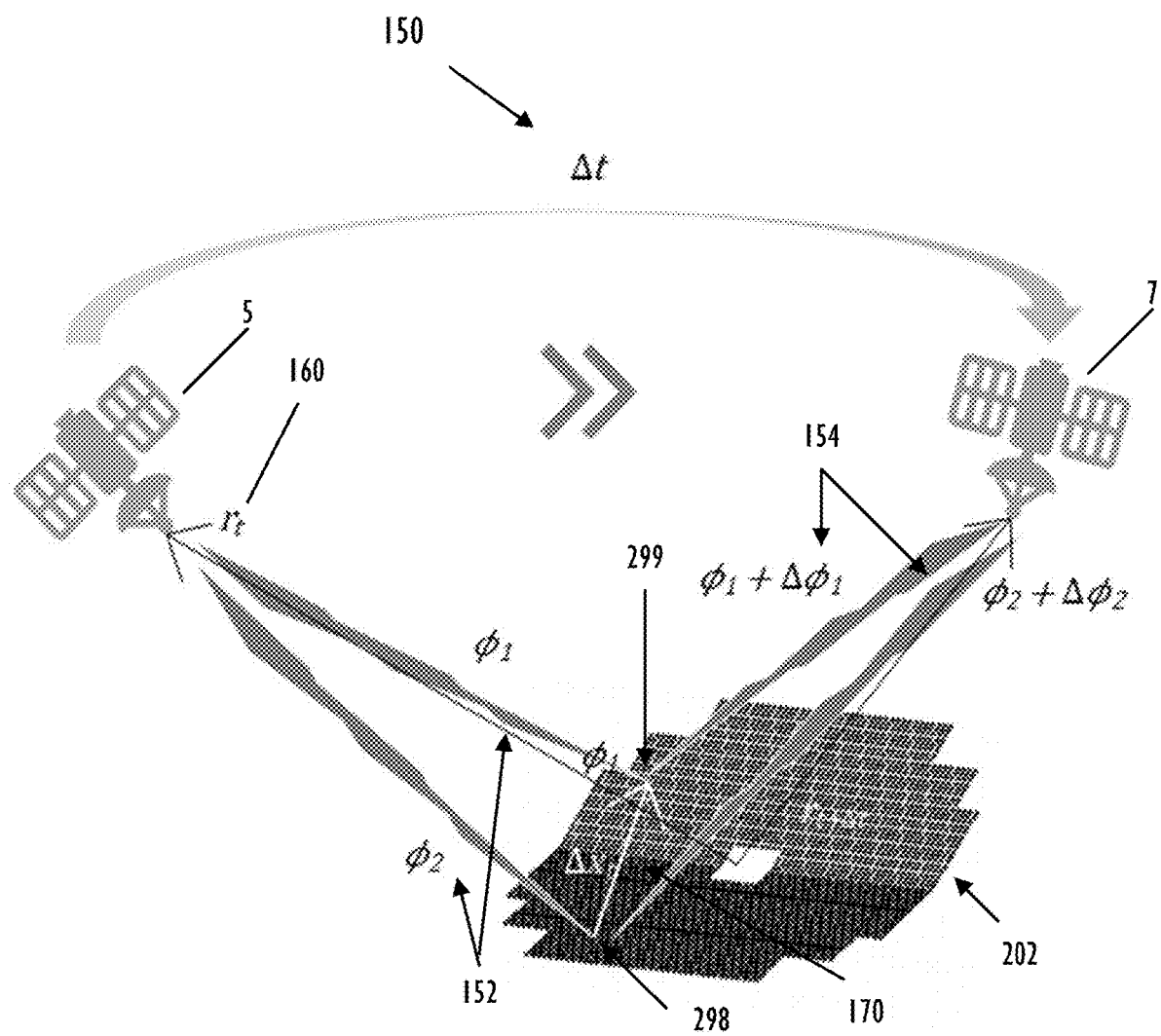
FIG. 11 is a perspective view of the system.

As shown in FIG. 11, each pair of GPS receivers must observe overlapping signals from the GPS constellation. The sensors can, for example, be part of the electronic circuits that form the small satellite. Reference X, Y and Z planes for a nominal array are shown in FIG. 7(*a*). The sensors can be a standard Global Positioning System (GPS) receivers or other sensor devices that automatically estimate position in a global co-ordinate system to the accuracy of carrier phase differential GPS (approx. 2 cm relative accuracy).

The sensor 50 in this embodiment is a standard Global Positioning System (GPS) sensor device that automatically estimates position in a global co-ordinate system and provides carrier phase and pseudorange output data for individual received GPS signals. As shown in FIG. 11, the GPS receivers 50 reside at different locations 298 and 299 on the satellite 202. Each receiver senses its position 160 relative to common GPS satellites (exemplified here as 135, 137), then use carrier phase information 152 as it changes 154 over time 150 to determine relative location 170 of the receivers. A group of such sensors 50 with mutually common received signals results in a set of solutions 51 providing relative offsets 170 between the receivers 50. This process is known as CD-GPS and is well-documented in academic and technical papers, though any suitable technique can be utilized. In order to perform the system operations described herein, the number of CD-GPS solutions 51 need only exceed some minimum requirement. There is no theoretical maximum to the number that may be used, as additional solutions tend to improve the solution.

The embodiment here further utilizes inertial measurement unit (IMU) sensors 49 that provide measurements of the motion of a subset of satellite elements 52. The raw IMU data is filtered 84 (FIG. 9) with e.g. a low-pass filter to produce a dataset with content at a higher rate than the structure estimator operation and with low-quality or outlying datapoints removed. Such IMU data is not required to coincide identically in time with the available CD-GPS data, but the sensors must be placed to capture oscillatory motion within the system. As with the GPS solutions, the number of IMU datapoints need only exceed some minimum requirement for system observability, but no theoretical maximum number exists.

Timing misalignments between CD-GPS and IMU solutions are resolved via propagation of the existing solution. These CD-GPS and IMU solutions are the inputs to a structure filter 83 that estimates the characteristic parameters describing the displacements of the spacecraft structural elements, as well as the persistent error (bias estimate) in the IMU rate measurements 85. These bias estimates are applied to the available rate data solution 60 even if new CD-GPS data is not available. During these periods, the structure motion is propagated 87 solely using IMU data to provide an estimate of the current location of each spacecraft element 90. Structure constants may be updated at each timestep 88 to reflect the most recent observations, or if no control is performed they may be updated only when CD-GPS is available. Note that the solution also requires as an input the baseline angular motion of the spacecraft system 89. Once structural parameters are estimated, the positions X, Y, and Z of the structure elements can be determined as often as required to provide data to beamforming. Instantaneous solution accuracy is sub-centimeter and can be extrapolated to similar accuracy over very short timespans.

Figure 1B:
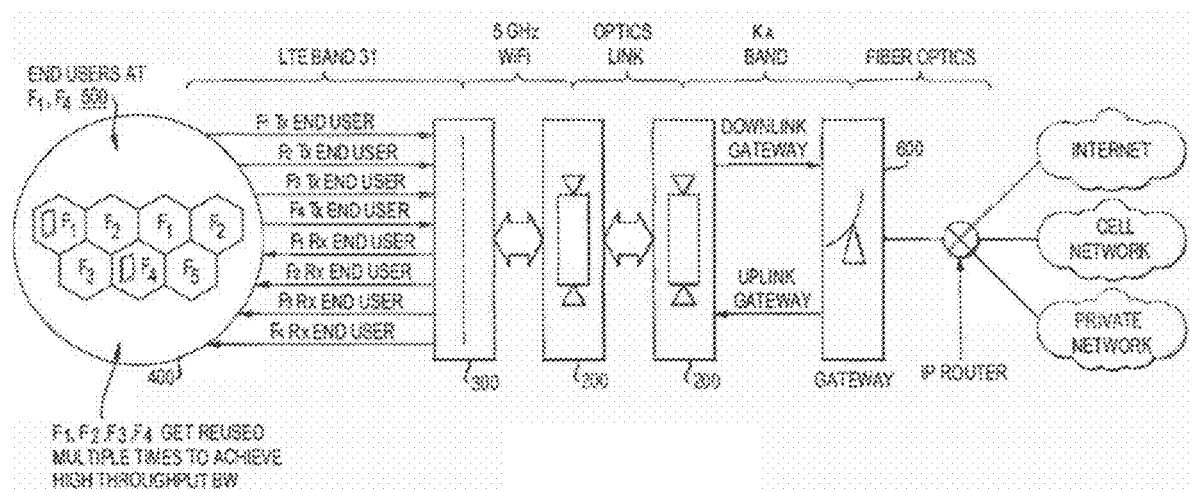

The placements of the sensors 49 and 50 in the example realization are chosen to coincide with the maximum displacements due to the primary oscillation modes of the aperture structure. Because the beamforming phase is used to determine the phase compensation based on the displacement of the structure elements 10 from a planar configuration, the system must compensate for any additional flexing by mechanically correcting the relative positioning of the spacecraft elements 302 where possible. Where each small satellite 10 has its own sensors 49 and 50, the deviation can be determined based on the position of that sensor. However, where a single sensor is provided for multiple small satellites, the deviation and correction for each small satellite 10 can be interpolated based on the positions of surrounding small satellites with respect to the sensor. In the embodiment shown here, these displacements are determined at the central satellite 200 (FIG. 1(*a*)) by calculating the apparent modal excitation 88. Determining the displacements resulting from these modes offers information that can be used to counteract their effects through a variety of means, and directly controlling these modes can improve spacecraft performance.

The present system resolves that measurement problem with a real-time estimation algorithm and integrates the solution with space-capable actuators to perform closed-loop control. The displacement filter 56 outputs the displacement data to the correction and control module 58, which uses an actuator 23 operating on an external field. In one embodiment, the actuator 23 can be an electromagnetic torque rod that applies a physical displacement to the structure 10 and correct the overall displacement of the array 5, reducing deflections about the bending axis 20. The correction and control module 58 uses current and extrapolated deformation constant estimates and determines apparent excitation energy. It then applies the correction to the actuator 23 by a damping torque model 62, which sends a torque command 66 to the torque rod.

The torque rod then applies a torque to the small satellite 10 to move it back toward the desired position at the point of maximum deflection, and the resultant torque is fed back to the model 64. In this way the peak displacement decays. The control law associated with the estimated CD-GPS/IMU mode dynamics can take any basic nonlinear form, or a linear form if the structure is sufficiently rigid. Because mode motion is oscillatory as a function of the estimated mode shape constants 88, and because digital compensation for some limited motion is possible, the selected control law need only force the system to remain within an allowable equilibrium displacements.

Thus, the processing device at the central controller 200 computes the commanded actuator input to move one or more of the plurality of antenna element structures 10 to correct for structural displacement of the antenna element structures. This computation may include prior known actuator command 64, which can affect system dynamics and required torque inputs going forward. The correction and control module 58 also outputs the displacement data (e.g., the sub-centimeter displacement) to the digital beamformer 68. The digital beamformer 68 computes and applies a phase correction to the beam. Any suitable technique can be utilized to apply an electronic correction, such as described in co-pending application no., which claims priority to 62/976,107, the entire contents of which are hereby incorporated by reference.

As a more specific example of the embodiment described herein, for systems with a significant first bending mode (see FIGS. 3-4), bending of the longest beam of the system about a perpendicular eigenaxis can a locally linearized as a 1-dimensional Euler-Bernoulli beam. Bending is approximately quadratic. The controller is designed only to stabilize the principal modes, so a constraint is placed on the energy imparted to the system ($|u|<|u_{max}|$) to prevent possible excitation of additional modes. As noted above, control is imparted symmetrically about the inertial eigenaxes. Deformation energy is driven to 0, with a hysteresis enacted to limit chatter as the allowed maximum deformation is achieved.

Thus, as described above, the present system determines the amount of local movement of the structural array 30, and then corrects that. It is further noted that co-pending application no., which claims priority to 62/976,107, determines the amount of flexing or bending of the structural array 5, and then corrects that by performing beam forming techniques that compensate for the bending. The entire content of that application is incorporated herewith.

In one example embodiment, structure 10 is an antenna assembly with a solar panel that receives solar energy from the Sun and generates solar power for use by the structure. The overall structure is flat and rectangular or square, such as a tile, with the communication components (e.g., antenna elements) at one side surface facing the Earth (nadir) to communicate with user devices (e.g., cell phones) and an opposite side surface facing in the opposition direction (zenith) with solar cells that generate solar power for use by the electronic components—e.g., a processing device, antennas, antenna front end modules. Here the control satellite 200 is fixedly connected to the small satellites 302, shown at the center of the array 100 and visible in the array 5.

It is important that the structure 10 and the array 5 remain as flat (i.e., planar) as possible to maximize solar power generation by the solar side and communication with the Earth on the communication side. Thus, it is desirable for the array 5 to be substantially flat, i.e., that the structures 10 are flat and that they are planar with one another. However, the structure 10 and/or array 5 is subject to forces in space that can cause the structure 10 or array 5 to flex or bend. To correct for any bending or flexing, the structure 10 has symmetrically-placed GPS units 50, inertial measurement units 49, and actuators 23 on each small spacecraft.

The processing device 12 in the common satellite 10 transmits required data to the control satellite 200 in real time, which derives the initial estimates of small displacements due to modes of the structure flex 11 via the CD-GPS solution 51 and IMU data 52 at time t=0. The control satellite 200 then determines the apparent effect of the bending of the structure 11 and estimates the modal contributions of the expected principal modes via structure constants. Approximately ¹⁄₁₀ second later, additional filtered IMU data 52 is received, and calculated bias and the spacecraft angular rate 89 are removed 86 from the sensed rate. The system is propagated forward 87. Structure constants may be updated 88 if acceleration or rate data suggests a large error in the estimate, resulting in a final displacement estimate 90 and 58.

This data is used as an input to the damping torque computation 62 which, along with any previous output torque 64, results in a new desired torque command 66. These torque commands are sent to the appropriate small satellite actuators 23 as torque rod activation signals. Finally, the estimate 90 and 58 is sent to the beamformer 68, which uses the data to improve its digital beamforming solution. This process repeats for 0.25 seconds until new CD-GPS data is available, at which point the estimated structure constants are updated using the position data.

When the structure 10 is configured as an antenna array 5, it (e.g., antenna 19 or antenna elements 302) communicates with processing devices on Earth, such as for example a wireless device including a user device (e.g., cell phone, tablet, computer) and/or a ground station. The present disclosure also includes the method of utilizing the structure 10 to communicate with processing devices on Earth (i.e., transmit and/or receive signals to and/or from). The present disclosure also includes the method of processing devices on Earth communicating with the structure 10 (i.e., transmit and/or receive signals to and/or from). In addition, while the structure 10 is used in Low Earth Orbit (LEO) in the examples disclosed, it can be utilized in other orbits or for other applications.

Still further, while the system has been described as for an array of antenna assemblies, the system can be utilized for other applications, such as for example data centers, telescopes, reflectors, and other structures, both implemented in space or terrestrially. The system of the present disclosure can also be utilized in combination with a phase correction system, such as shown and described in U.S. Application No., filed herewith, entitled Compensating Oscillations in a Large-Aperture Phased Array Antenna, claiming priority to U.S. Application No. 62/976,107, filed Feb. 13, 2020, the entire contents of which are hereby incorporated by reference.

In addition, it is noted that operation is described as occurring at the control satellite 200, which may or may not be fixedly embedded in the array. However, operation can also be at the common satellite 10 processing device 12 if GPS and IMU data from other structures 10 is distributed in such fashion. In another embodiment of the present disclosure, data (such as position and attitude) can be transmitted from the satellite 10 and/or 200 (e.g., by the common satellite processing device 12 and/or the control satellite processing device, if such are not coincident) to a ground station. The ground station processing device can then determine the necessary correction and/or other flight information and transmit a control signal to the satellite 10 and/or 200 (e.g., common satellite processing devices 12 and/or control satellite processing device) to control the correction via the torque rod 23, in addition to performing other ground-based tasks.

It is further noted that the drawings may illustrate and the description and claims may use several geometric or relational terms and directional or positioning terms, such as planar, linear, curved, circular, flat, left, and right. Those terms are merely for convenience to facilitate the description based on the embodiments shown in the figures, and are not intended to limit the disclosure. Thus, it should be recognized that the system can be described in other ways without those geometric, relational, directional or positioning terms. In addition, the geometric or relational terms may not be exact. For instance, walls or surfaces may not be exactly flat, or planar to one another but still be considered to be substantially planar because of, for example, roughness of surfaces, tolerances allowed in manufacturing, etc. And, other suitable geometries and relationships can be provided without departing from the spirit and scope of the disclosure.

The foregoing description and drawings should be considered as illustrative only of the principles of the disclosure. The system may be configured in a variety of shapes and sizes and is not intended to be limited by the embodiment. Numerous applications of the system will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

The invention claimed is:

1. A system comprising:
    a plurality of structures each having a planar surface, the plurality of structures connected to form a structural array with a planar array surface;
    a processing device configured to determine, based on one or more bias estimates and one or more structure constants, a correction for a structural displacement of the plurality of structures; and
    an actuator configured to apply the correction to the plurality of structures by applying a physical displacement to the plurality of structures.

2. The system of claim 1, wherein each structure of the plurality of structures comprises an antenna assembly.

3. The system of claim 1, wherein the processing device is further configured to determine the structural displacement of the plurality of structures by determining a position and velocity difference between Global Positioning System (GPS) receivers based on carrier-phase differential GPS (CD-GPS) measurements.

4. The system of claim 1, wherein the actuator comprises a torque rod.

5. The system of claim 1, wherein the system further comprises:
    a sensor coupled to one or more structures of the plurality of structures and configured to detect a position of the one or more structures of the plurality of structures.

6. The system of claim 1, wherein to determine the correction for the structural displacement of the plurality of structures, the one or more processors are configured to compute one or more phases used for beamforming.

7. The system of claim 1, wherein to determine the correction for the structural displacement of the plurality of structures, the one or more processors are configured to compute an apparent modal excitation.

8. The system of claim 1, wherein to determine the correction for the structural displacement of the plurality of structures is based on feedback from the actuator.

9. The system of claim 1, further comprising:
    a beamformer configured to:
        receive structural displacement data from the one or more processors;
        compute a phase correction based on the structural displacement data; and
        apply the phase correction to a beam to a user device on Earth.

10. A system comprising:
    a memory;
    one or more processors coupled to the memory and configured to:
        determine a structural displacement of a plurality of structures having a planar surface, the plurality of structures connected to form a structural array;
        determine, based on one or more bias estimates and one or more structure constants, a correction for the structural displacement of the plurality of structures; and
        send a command to an actuator configured to apply the correction to the plurality of structures by applying a physical displacement to the plurality of structures.

11. The system of claim 10, wherein to determine the structural displacement of the plurality of structures, the one or more processors are further configured to determine a position and velocity difference between Global Positioning System (GPS) receivers based on carrier-phase differential GPS (CD-GPS) measurements.

12. The system of claim 10, wherein the actuator comprises a torque rod.

13. The system of claim 10, wherein to determine the correction for the structural displacement of the plurality of structures, the one or more processors are configured to compute one or more phases used for beamforming.

14. The system of claim 10, wherein to determine the correction for the structural displacement of the plurality of structures, the one or more processors are configured to compute an apparent modal excitation.

15. The system of claim 10, wherein to determine the correction for the structural displacement of the plurality of structures is based on feedback from the actuator.

16. The system of claim 10, wherein the one or more processors are further configured to:
    send structural displacement data to a beamformer configured to compute a phase correction based on the structural displacement data and apply the phase correction to a beam to a user device on Earth.

17. A method comprising:
    determining, by a processing device, a structural displacement of a plurality of structures having a planar surface, the plurality of structures connected to form a structural array;
    determining, by the processing device, a correction for the structural displacement of the plurality of structures based on one or more bias estimates and one or more structure constants; and sending, by the processing device, a command to an actuator configured to apply the correction to the plurality of structures by applying a physical displacement to the plurality of structures.

\* \* \* \* \*